US012754144B2

(12) United States Patent
Bendjus et al.

(10) Patent No.: US 12,754,144 B2
(45) Date of Patent: Oct. 6, 2026

(54) METHOD FOR IDENTIFYING DEFECTS IN MATERIALLY INTEGRAL CONNECTIONS

(71) Applicant: Fraunhofer-Gesellschaft zur Förderung der Angewandten Forschung E.V., Munich (DE)

(72) Inventors: Beatrice Bendjus, Dresden (DE); Lili Chen, Dresden (DE); Ulana Cikalova, Dresden (DE); Mike Röllig, Dresden (DE)

(73) Assignee: Fraunhofer-Gesselschaft zur Förderung der Angewandten Forschung E.V., Munich (DE)

( * ) Notice: Subject to any disclaimer, the term of this patent is extended or adjusted under 35 U.S.C. 154(b) by 177 days.

(21) Appl. No.: 18/681,886

(22) PCT Filed: Aug. 9, 2022

(86) PCT No.: PCT/EP2022/072343
§ 371 (c)(1),
(2) Date: Feb. 7, 2024

(87) PCT Pub. No.: WO2023/017029
PCT Pub. Date: Feb. 16, 2023

(65) Prior Publication Data
US 2025/0137937 A1 May 1, 2025

(30) Foreign Application Priority Data
Aug. 11, 2021 (DE) ..................... 10 2021 208 775.2

(51) Int. Cl.
*G01N 21/95* (2006.01)
*G01N 21/88* (2006.01)
(Continued)

(52) U.S. Cl.
CPC ..... *G01N 21/9501* (2013.01); *G01N 21/8806* (2013.01); *G06T 7/001* (2013.01);
(Continued)

(58) Field of Classification Search
CPC ........... G01N 21/9501; G01N 21/8806; G01N 2201/0612; G01N 2021/8438;
(Continued)

(56) References Cited

U.S. PATENT DOCUMENTS 5,535,006 A * 7/1996 Telschow ............. G01R 31/311 356/394
7,079,257 B1 * 7/2006 Kirkpatrick ............... G01L 1/24 356/502
(Continued)

FOREIGN PATENT DOCUMENTS

DE 102014224852 A1 6/2015
DE 102017203765 A1 9/2018
(Continued)

OTHER PUBLICATIONS

Chen L et al. "Laser speckle photometry: an advanced method for defect detection in ceramics" Proceedings of SPIE; {Proceedings of SPIE; ISSN 0277-786X; vol. 8615], SPIE, 1000 20th St. Bellingham WA 98225-6705 USA, vol. 10834, Sep. 7, 2018 (Sep. 7, 2018), pp. 1083415-1083415.
(Continued)

*Primary Examiner* — Tarifur R Chowdhury
*Assistant Examiner* — Kemaya Nguyen
(74) *Attorney, Agent, or Firm* — Marshall & Melhorn, LLC

(57) ABSTRACT

Using a first measuring module, monochromatic electromagnetic radiation from a source is directed onto a semiconductor element in a continuously defocused manner and a pulse of electromagnetic radiation with a wavelength
(Continued)

greater than 400 nm is directed from a source. Subsequently, within a time interval, using a digital camera as an optical detector, the focal plane of which corresponds to the interface between semiconductor element and connecting layer, at least three images of speckle patterns are captured at predeterminable times and are transferred to an electronic evaluation unit. In the electronic evaluation unit for at least one measuring position a temporal and spatial domain analysis is performed. The result obtained in this way is compared with results obtained in advance for defect-free and defective materially integral connections of the same type to decide whether specified quality criteria of the tested materially integral connection have been achieved or not.

12 Claims, 2 Drawing Sheets

(51) Int. Cl.
*G06T 7/00* (2017.01)
*H04N 23/56* (2023.01)

(52) U.S. Cl.
CPC ..... *H04N 23/56* (2023.01); *G01N 2201/0612* (2013.01); *G06T 2207/30148* (2013.01)

(58) Field of Classification Search
CPC ........... G01N 21/4788; G01N 21/8422; G01N 21/9505; G01N 2021/479; G01N 25/72; G06T 7/001; G06T 2207/30148; H04N 23/56; G01B 11/162
See application file for complete search history.

(56) References Cited

U.S. PATENT DOCUMENTS

| | | | | |
|---|---|---|---|---|
| 10,955,275 | B2 * | 3/2021 | Rice | G01F 1/74 |
| 2019/0212124 | A1 * | 7/2019 | Zalevsky | G01B 11/162 |
| 2022/0129660 | A1 * | 4/2022 | Xue | G06V 40/193 |

FOREIGN PATENT DOCUMENTS

| | | | | |
|---|---|---|---|---|
| DE | 102017203765 B4 * | 4/2022 | G01B 11/16 |
| WO | 2017030652 A1 | 2/2017 | |

OTHER PUBLICATIONS

Chen Lili et al. "Laser speckle photometry—Optical sensor systems for condition and process monitoring" Materialpruefung, DE, Mar. 2019 (Mar. 2019), pp. 213-219, Retrieved from the Internet: http://dx.doi.org/10.3139/120. II 1308.

Chen Lili et al. "Stress Characterization of Ceramic Substrates by Laser Speckle Photometry" 2019 42nd International Spring Seminar On Electronics Technology (/SSE), IEEE, May 15, 2019 (May 15, 2019), pp. 1-6.

Arizaga Ricardo. "Display of local activity using dynamical speckle patterns" Optical Engineering, Bellingham, vol. 41, No. 2, Feb. 2002 (Feb. 2002), p. 287.

European Patent Office, International Search Report and Written Opinion in Application No. PCT/EP2022/072343, dated Oct. 28, 2022, 13 pages, Rijswijk, Netherlands.

German Patent and Trademark Office, Office Action in Appliction No. DE 10 2021 208 775.2, dated Apr. 29, 2022, 4 pages. Munich Germany.

* cited by examiner

METHOD FOR IDENTIFYING DEFECTS IN MATERIALLY INTEGRAL CONNECTIONS

FIELD

The invention relates to a method for identifying defects in materially integral connections formed between semiconductor elements and a metallization and/or a substrate in power and hybrid electronics. It can be used for integration into monitoring systems for fast production processes and for fault identification for various materials without restrictions.

BACKGROUND

In power electronics, special substrate structures are used in many electronic assemblies. High-performance semiconductor elements are joined to ceramic substrates, particularly in power electronics and hybrid electronics. Specifically, they consist of a ceramic substrate (e.g. DCB and AMB) soldered or sintered with semiconductor components (e.g. diode, IGBT and MOSFET). One application example is the power converter modules for electric drives in cars, which are often connected to a cooling water circuit for optimum cooling. The quality of the substrate and the components mounted on it, and in particular the electrical and thermal connections between these and the substrate affect the power of the entire electrical system. In the manufacturing process of the substrate, the faults caused by the connecting process (e.g. soldering or sintering) lead to a weaker thermal bond and therefore represent a very critical problem. For example, the connecting layer between the semiconductor element and the substrate has cavities (contraction cavities, voids, air pockets, foreign material inclusions, etc.) due to process or material influences. During operation of the electronics, the cavities lead to insufficient heat dissipation from the respective semiconductor element and the electronics works unstable. In addition, thermo-mechanical stress occurs due to the mismatch of the thermal expansion coefficients of the joining materials. Cavities also weaken the mechanical stability of the materially integral connection. If the connection faults cannot be identified at an early stage in the production line, the fault rate of the finished electronic modules increases. This leads to a significant increase in costs, production time and, in the worst case, premature failure of the components during operation if faults are not identified. This reduces the reliability of safety-relevant electronics, for example.

An immediate, sufficiently precise technical solution is not yet available. There is no mature and inline-capable technology or method on the market that is capable of identifying the faults in the area of a connecting layer of the abovementioned substrate structure. Conventional non-destructive testing (NDT) methods such as ultrasound microscopy, X-ray imaging and infrared thermography are usually carried out offline on the production line to analyze faults. These methods are usually time-consuming and expensive. The results contain information about faults, defects and anomalies in the area of a connection point. They are often limited by the resolution and test speed. In addition, the material and the method of the connecting process also dominate the results of a conventional NDT process. For example, the X-ray imaging process can identify the fault in a solder layer, but not in the sintered layer. Analyses of porosity density in sintered connections are also necessary for quality assessment and have not been testable to date. The reason for this is that the porosity of sintered connections is too low for the resolution of X-ray images.

Acoustic scanning microscopy (SAM) uses acoustic waves in the range of 15 MHz to 300 MHz to examine material surfaces and volumes. The respective sound waves penetrate a sample and are partially absorbed by the material, scattered by fine structures or reflected differently at interfaces between two materials according to their acoustic impedance. According to this principle, individual layers or individual interfaces can be evaluated by examining patterns and propagation times within certain time intervals of the overall echo. By using SAM, defects in sintered connections can be identified. However, the modules must be placed in water for inspection as a coupling agent, which causes contamination and requires an additional drying process. In addition, complex surface topologies interfere with the evaluations.

Transient thermal analysis (TTA) directly examines the thermal behavior during heating and cooling of the module and could be a useful parametric method. However, the long measuring time and the lack of automated equipment prohibit large-volume inspections in a short time.

The infrared test is based on Planck's law of thermal radiation, which scans the surface of a ceramic product based on temperature differences caused by defects, thereby measuring the position of the surface or internal defects. However, due to the limitation of the minimum temperature resolution of existing infrared thermal imaging devices, conventional infrared testing has a low sensitivity for the identification of micro-defects in ceramic materials.

SUMMARY

It is therefore the object of the invention to provide options for identifying defects in corresponding materially integral connections, with which a statement can be obtained in a short time and with sufficient accuracy about the achievement or non-achievement of predetermined quality characteristics of a materially integral connection.

In accordance with the invention, this object is achieved by a method having the features of the claims. Advantageous embodiments and further developments of the invention can be realized with features defined in dependent claims.

A first measuring module is used in the method according to the invention for identifying defects in materially integral connections, which can occur in the area between a surface of a semiconductor element, a connection layer and a surface of a substrate.

In this process, monochromatic electromagnetic radiation from an illumination source is continuously directed onto the surface of the semiconductor element, and

- a pulse of electromagnetic radiation with a wavelength greater than 400 nm is directed from at least one thermal excitation source with a pulse duration, which is preferably in the range from 0.2 s to 5 s.

Subsequently, within a time interval, which is preferably in the range from 7.5 s to 15 s, using a digital camera as an optical sensor, at least three, preferably at least five, images of speckle patterns are captured at predeterminable times and fed to an electronic evaluation unit. The focal plane of the digital camera coincides with the interface between the semiconductor element and the connection layer, which can be achieved or adjusted with suitable optical elements.

Then, in the electronic evaluation unit, for at least one measuring position ij, a temporal and spatial domain analysis using the equations $C_{ij}=\Sigma_\tau|I_{ij}(\tau+1)-I_{ij}(\tau)|$ and $C_{ij}=\Sigma_\tau|I_{ij}(\tau)-I_{ij}(1)|$ with $I_{ij}(\tau)$ as the identified intensity is performed at the respective measuring position ij, the result obtained in this way is compared with results obtained in advance for defect-free and defective materially integral connections of the same type in order to decide whether predetermined quality criteria of the tested materially integral connections have been achieved or not.

The excitation source can be a laser beam source, a flash lamp, a contact heating device, which can be in the form of a mat or pin, and a convection heating device, with which heated gas can be directed onto the respective surface, or combinations of these excitation sources. Process heat can also be used for thermal excitation.

Using the laser radiation source as a thermal excitation source, a pulse of focused electromagnetic radiation, at which a power density (fluence) of at least 0.5 $W/mm^2$ has been achieved in the focal spot on the surface of the semiconductor element, should be directed at a measuring position.

A materially integral connection existing between a semiconductor element and a substrate made of a ceramic material can be tested.

The substrate with the semiconductor element which is connected in a materially integral manner thereto should be statically fixed in relation to the excitation source and a unit detecting the respective planar speckle pattern, in particular a digital camera, at least during the emission of the monochromatic electromagnetic radiation and the spatially resolved detection of the planar speckle pattern that forms.

In particular, a laser radiation source or at least one laser diode can be used as the illumination source.

A second measuring module can be used on the side of the substrate opposite the side on which the semiconductor element is connected in a materially integral manner. The second measuring module can be of the same type as the first measuring module with an illumination source and a digital camera as an optical sensor for capturing static white light images and electronic image processing in the electronic evaluation unit. This allows speckle patterns to be captured with a digital camera as an optical sensor as static white light images or wavelengths selected by optical filtering and analyzed with electronic image processing in the electronic evaluation unit.

The first measuring module can be used to detect electromagnetic radiation which is reflected diffusely and in a directed manner.

The result obtained by means of the electronic evaluation unit can be taken into account optically, acoustically indicated and/or for the following processing steps of the mounted substrate. In the latter case, for example, reworking can be carried out or no further processing can be carried out on the respective semiconductor element that has been identified as not meeting quality requirements.

The invention is based on laser speckle photometry in the connecting layer between semiconductor element and the substrate (ceramic or printed circuit board). It can be used in the assembly process of electronic power modules as well as in hybrid electronics when a semiconductor element is connected to a substrate (ceramic circuit carrier or printed circuit board).

A speckle pattern is created when an optically rough surface is illuminated with a coherent light source. The scattered waves from different positions of the illuminated surface interfere on the rough surface in the observation plane and generate the speckle pattern—a spatial structure with randomly distributed intensity minima and maxima. The optical phenomena can be detected with the aid of CCD/CMOS sensors, in particular a digital camera. A speckle pattern contains fingerprint information about the 3D nature of the surface. In order to be able to derive this information about the scattering objects, work should be carried out in the near-field range. The most frequently examined variables are usually speckle size and contrast.

Laser speckle photometry (LSP) is based on the identification and analysis of thermally activated characteristic speckle dynamics in a non-stationary optical field. The temporal and local changes in the speckle patterns allow correlations to be made with material parameters when suitably evaluated. In order to determine these parameters, a correlation model is set up using reference values, the process constraints and the material characteristics. The algorithms thereby reflect process-describing parameters. The LSP can be used for real-time monitoring and has a high sensitivity for both out-of-plane and inplane deformations. This is the key feature for identifying faults in a materially integral connection with a connecting layer. The LSP measures the spatio-temporal dynamics of the speckle, which can be captured by the change in intensity of each individual measurement position (pixel) $\Delta I_{ij}$, using an optical detector in a two-dimensionally spatially resolved manner. The basic algorithm of the LSP is based on the calculation of the thermal diffusivity using the solution of the heat transfer equation. With the aid of a further development of the previous algorithms, the interaction between the speckle dynamics and the state of the sample, such as porosity and defect density, can be determined using selected correlation functions.

It can be used in the assembly process of an electronic power module as well as in hybrid electronics when a semiconductor element is connected to the substrate (ceramic circuit carrier or printed circuit board). The inline measurement process can be performed with the following steps:

- The LSP measurement setup is moved by a robot arm system to the connected semiconductor element (measurement position) and a camera is focused as an optical sensor on the interface between semiconductor element and connecting layer;
- An excitation source emits pulsed electromagnetic radiation, in particular laser radiation with a pulse duration in the range of approx. 0.2 s-5 s, and the digital camera as an optical sensor captures the corresponding speckle pattern during both the heating and cooling phases within a time interval of approx. 15 s in total.
- The measurement data is transmitted to an evaluation unit in order to carry out a real-time analysis, which takes approx. 2 s. The corresponding results are displayed on a user interface.
- At the same time, the LSP setup is moved to the next measuring position to repeat the test procedure.

LSP can be used to identify surface delamination or even small cavities (voids) in the connecting layer as defects, provided they are open in the direction of the substrate and/or the semiconductor. Smaller closed punctiform defects are not reliably identified. However, these are not relevant to quality. Machine learning algorithms can also be used to automatically classify the type of defects identified. The evaluation electronics can be trained on the basis of the resulting captured images for different fault types (LSP database). For further applications, the model can be used automatically to perform defect identification and classification for the materially integral connection on different substrates.

For the aforementioned invention, the measurement setup of the LSP should essentially be constructed with the following components:

A coherent illumination source for generating the speckle pattern, a thermal excitation source for generating the time-resolved dynamic speckles and a digital camera for capturing the speckle signal for further evaluation as an optical sensor. By using the different wavelengths of at least one laser as a thermal excitation source (e.g. from the ultraviolet to the infrared range, 261 nm to 1700 nm), the electromagnetic radiation can penetrate to different depths of the substrate structure in order to be able to identify the respective dynamic speckle pattern on the surface. During thermal excitation of the tested sample, the thermal wave propagates from the surface to the connecting layer, which leads to thermal expansion. The wavelength range of an excitation laser as a thermal excitation source can range from 400 nm to 1700 nm. In the event of a fault in the connecting layer, the local heat wave is accumulated in the defective volume due to the lower thermal conductivity of air compared to the material of the connecting layer. In this case, the different thermal behavior in the volume is fed back to the surface, which can be distinguished from the speckle dynamics measured on the sample surface. Defects can be identified in both the heating and cooling process. Based on this measuring principle, the LSP method can also be used to identify the connecting faults of both surfaces of the substrate, i.e. the semiconductor element surface and the free ceramic substrate surface. For some substrate structures with thin metallization layers, due to the high transmission of the ceramic (e.g. $Al_2O_3$ and AlN), an additional second optical measurement setup with white light illumination (or infrared illumination) can also be used for measurements from the back of the substrate in order to identify the connection faults from the ceramic side of a substrate on which no semiconductor element is present. With the help of image processing methods, the connection faults open to the ceramic layer can also be identified from the static white light images. The prerequisite for the latter is an exposed ceramic substrate.

A temporal and spatial domain analysis is used to evaluate the dynamic speckle patterns captured by the LSP setup. This algorithm calculates the accumulation of the intensity difference between two neighboring identified speckle patterns (frames). The algorithm is represented by equation (1). The sum of the intensity differences amplifies the slight difference that is hidden in the speckle movement between the defective and intact connecting layer. Therefore, defects in the resulting images appear as areas of increased brightness.

$$C_{ij} = \sum_{\tau} |I_{ij}(\tau+1) - I_{ij}(\tau)|, \qquad (1)$$

where $I_{ij}(t)$ is the intensity of the pixel at the position (i,j) at the time $\tau$.

As a variant of equation (1), the sum accumulation of the intensity difference between the first speckle pattern image captured with the optical sensor (digital camera) and the speckle pattern images captured subsequently in time can also be calculated. This can represented by equation (2). The results calculated by equations (1) and (2) are both applied.

$$C_{ij} = \sum_{\tau} |I_{ij}(\tau) - I_{ij}(1)|, \qquad (2)$$

The method can be further developed to automatically classify substrates 1*c* that are well and poorly connected to a semiconductor element 1*a*. This can be performed by calculating the total defect area/volume based on the resulting speckle pattern images obtained using the LSP technique.

Identification of internal defects, faults and anomalies in soldered and sintered connections in flat connection contacts of semiconductor chips (e.g. in power electronics), identification of porosity density fluctuations in sintered connections (e.g. silver sintered connections, copper sintered connections) can be achieved.

An application for joining connections between semiconductor element and substrate, whereby the substrates can consist of ceramics, PCB material (FR4 and copper) or insulated metal substrates (IMS, layered metal-insulation-copper compound), as well as an application for flat and point-like (e.g. solder contacts on BGA, QFN) connecting elements of electronics with 100% inline monitoring for defects in the joining zone between semiconductor element and substrate structure, die display of the real-time results as selectable result output: as image/parameter list/signal light display with higher resolution of the LSP system are possible.

It can also be used in harsh environmental conditions. First and second measuring modules are simple and cost-effective. A modular inspection technology setup for integration into optical inspection systems in semiconductor and electronics production is possible.

DESCRIPTION OF THE FIGURES

In the following, the invention is explained in more detail by way of example.

In the drawings.

DETAILED DESCRIPTION

Figure 1:
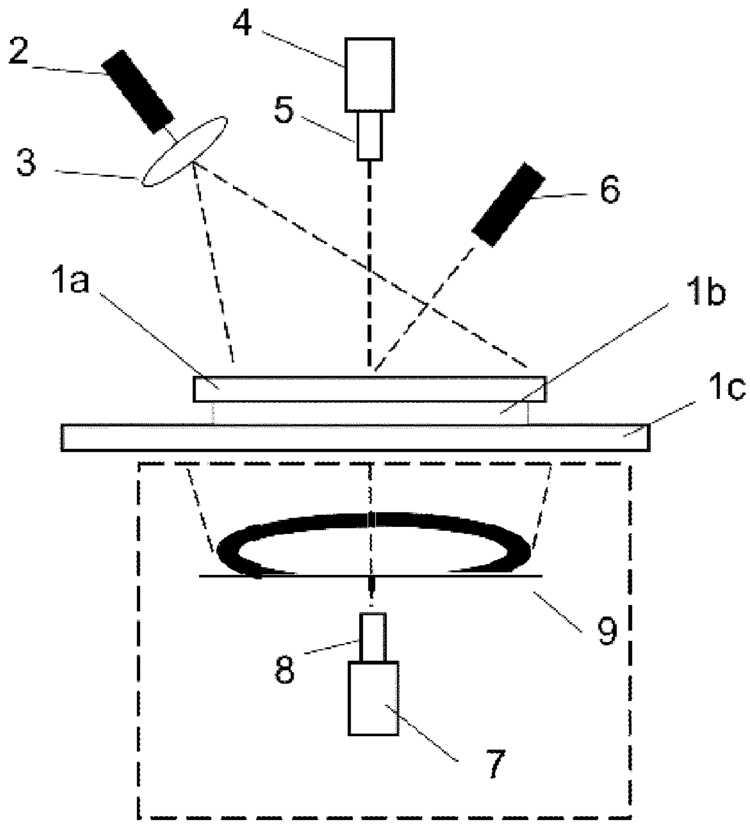
FIG. 1 shows a schematic example of a setup with which laser speckle photometry (LSP) can be carried out during a measurement on the surface of the substrate structure.

FIG. 1 shows a measuring system for carrying out a LSP, which is formed with two measuring modules. The first module is the measuring module, which is equipped with an illumination laser device 2 (e.g. laser diode), an optical lens system 3, a digital camera as optical sensor 4, which in this example is combined with a lens 5, and a thermal excitation source 6 in the form of a laser. The illumination laser device 2 emits laser beams that are emitted through the optical lens system 3 and impinge on the surface of a semiconductor element 1*a* in order to illuminate it. The thermal excitation source 6 emits laser beam pulses with high power. Alternatively, lamps (flash or halogen), contact heating (mat or pin-type), additionally generated radiant and convection heat (hot air blower) or process heat (soldering or sintering heat, heat treatment) or combinations of several of one or different types can also be used. The respective heat wave generated by the thermal excitation source 6 propagates in the volume of semiconductor element 1*a*, connecting layer 1*b* and substrate 1*c*, and part of the heat wave is absorbed by the semiconductor element 1*a*. On the one hand, the absorbed thermal wave causes a thermal expansion of semiconductor element 1*a*, the connecting layer 1*b* and possibly the substrate 1*c*, which leads to the dynamic speckle patterns on the surface of the semiconductor element 1*a*. On the other hand, the absorbed thermal wave propagates from the semiconductor element 1*a* to the connecting layer 1*b*. The faults in the area of the connecting layer 1*b* can be identified by the feedback to the dynamic speckles on the surface of the semiconductor element 1*a*. The dynamic speckle patterns on the surface of the semiconductor element 1*a* are recorded by the digital camera as optical sensor 4. The wavelength of the electromagnetic radiation emitted by the illumination laser source 2 and the thermal excitation source 6 can be adjusted from the to the infrared range as required. The first measuring module can either be directed onto the surface of the semiconductor element 1*a* or the surface of the substrate 1*c*. The second measuring module is a supplementary measurement setup with a circular LED module 9 and a digital camera 7, which is combined with a lens 8. The wavelength of the electromagnetic radiation emitted by the LED module 9 is adjustable. The electromagnetic radiation reflected by the surface of the substrate 1*c* (ceramic layer) of the connecting layer 1*b* is captured in a spatially resolved manner by the digital camera 7. The second measuring module can only be mounted on the side of the substrate 1*c* opposite the side on which the semiconductor element 1*a* is arranged. The captured speckle signals are transferred to an evaluation module 10 for further processing.

Figure 2:
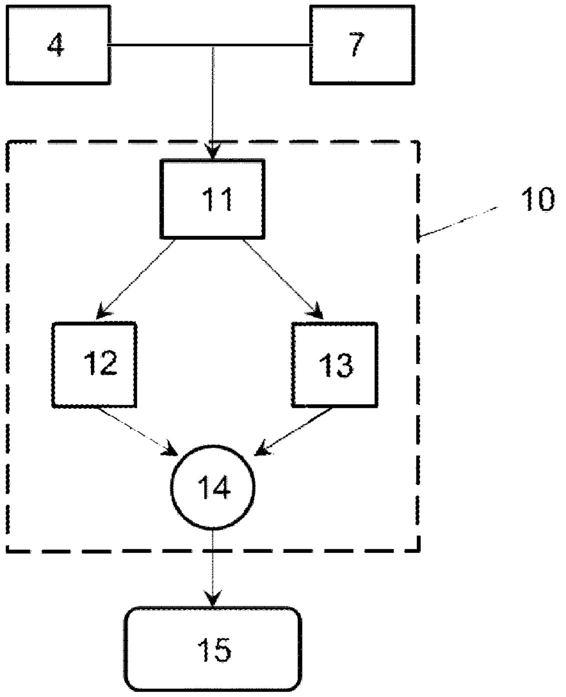
FIG. 2 shows a block diagram of a data processing in which the identified LSP signals are parameterized and analyzed and a user interface turns into a display for the output result.

FIG. 2 schematically shows how the measurement data captured with the digital cameras 4 and 7 in spatially resolved manner are stored in a data storage server 11. The measurement data from the main measuring module are transferred to the evaluation unit 12 in order to perform the calculations based on equations (1) and (2). The measurement data from the second module are fed to an image processing unit 13 to evaluate the static white light images. The results of both evaluation modules are transmitted to an LSP database 14 in order to merge the results obtained at the same two-dimensional measurement position i,j during the capture of speckle patterns occurring subsequently in time. The final results are then transmitted from the evaluation unit 10 to a user interface 15 to display the real-time results.

Figure 3:
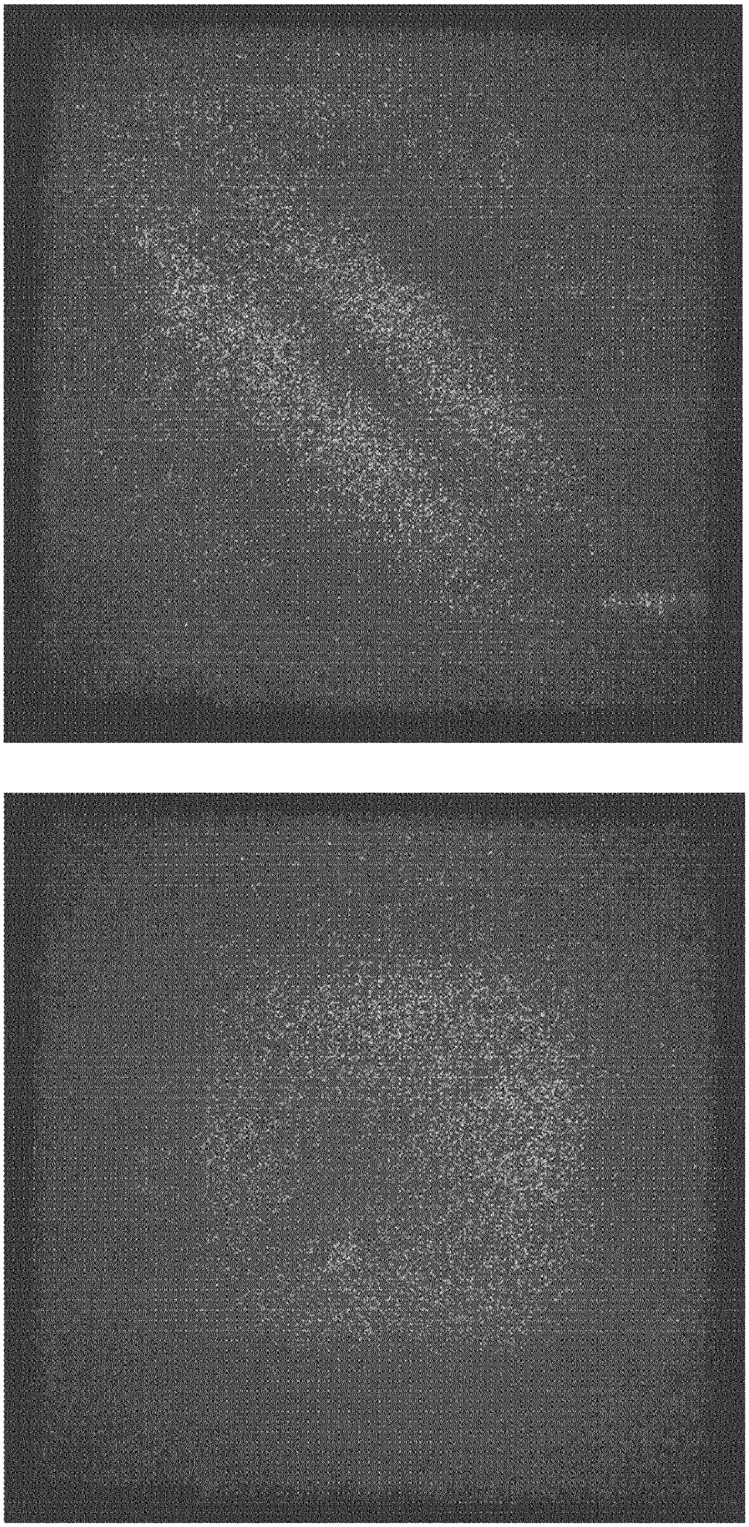
FIG. 3 shows an example of the identification of defects in the connecting layer using the LSP technique.

FIG. 3 shows an example of the result of fault identification in the connecting layer 1*b* using the dynamic speckle signals. The defective area in the volume can be described by the increased brightness in the resulting captured image of a speckle pattern. The maximum spatial resolution of the LSP measurement setup is 0.7 μm/pixel.

The invention claimed is:

1. A method for identifying defects in materially integral connections which can occur in the area between a surface of a semiconductor element, a connecting layer and a surface of a substrate, in which, using a first measuring module, monochromatic electromagnetic radiation from an illumination source is directed in a continuously defocused manner onto the surface of the semiconductor element, and a pulse of electromagnetic radiation with a wavelength greater than 400 nm is directed from at least one thermal excitation source, and subsequently, within a time interval, using a digital camera as an optical detector, wherein the digital camera is focused on the interface between semiconductor element and connecting layer, at least three images of speckle patterns are captured at predeterminable times and are transferred to an electronic evaluation unit, wherein in the electronic evaluation unit, for at least one measuring position ij, a temporal and spatial domain analysis by the equations $$C_{ij}=\sum_{\tau}|I_{ij}(\tau+1)-I_{ij}(\tau)| \text{ and}$$

$$C_{ij}=\sum_{\tau}|I_{ij}(\tau)-I_{ij}(1)|$$

with $I_{ij}(\tau)$ as captured intensity, τ as time, I as intensity and C as accumulation of the intensity difference between two neighboring identified speckle patterns are performed at the respective measuring position ij and a result obtained in this way is compared with results obtained in advance for defect-free and defective materially integral connections of a same type in order to decide whether specified quality criteria of the tested materially integral connection have been achieved or not.

2. The method according to claim 1, wherein a laser beam source, a flash lamp, a contact heating device or a convection heating device or combinations of these excitation sources is/are used as the excitation source.

3. The method according to claim 1, wherein using the laser radiation source as a thermal excitation source, a pulse of electromagnetic radiation at which a power density of at least 0.5 W/mm$^2$ has been achieved in the focal spot on the surface of the semiconductor element is directed at a measuring position.

4. The method according to claim 1, wherein the substrate with the semiconductor element materially integral thereto is statically fixed in relation to the excitation source and a unit detecting the respective planar speckle pattern, at least during the emission of the monochromatic electromagnetic radiation and the spatially resolved detection of the planar speckle pattern that forms.

5. The method according to claim 1, wherein the illumination source used is a laser radiation source or at least one laser diode.

6. The method according to claim 1, wherein the thermal excitation source is operated with a pulse duration in the range from 0.2 s to 5 s and/or at least three images of speckle patterns are captured within a time interval in the range from 7.5 s to 15 s.

7. The method according to claim 1, wherein a second measuring module is used on the side of the substrate opposite the side on which the semiconductor element is connected in a materially integral manner.

8. The method according to claim 7, wherein the second measuring module is of a same type as the first measuring module, or using a second illumination source, which directs electromagnetic radiation in a broadband wavelength range at a field angle or telecentrically onto the surface of the substrate which is opposite the side on which the semiconductor element is connected in a materially integral manner, using a second digital camera as an optical sensor, static white light images or wavelengths selected by optical filtering are captured and are evaluated using electronic image processing in the electronic evaluation unit.

9. The method according to claim 1, wherein speckle patterns are detected using the first measuring module as electromagnetic radiation being reflected diffusely and in a directed manner.

10. The method according to claim 1, wherein the result is output optically, acoustically and/or is taken into account for subsequent processing steps of the mounted substrate.

11. The method according to claim 1, wherein electromagnetic radiation with different wavelengths is emitted with the thermal excitation source, so that the respective electromagnetic radiation of the individual wavelengths penetrates to different depths of the semiconductor element, the connecting layer or the substrate.

12. The method according to claim 1, wherein a materially integral connection between a semiconductor element and a substrate, which consists of a ceramic material, is tested.

* * * * *